(12) United States Patent
Zisowski

(10) Patent No.: US 7,228,434 B2
(45) Date of Patent: Jun. 5, 2007

(54) METHOD OF PROTECTING THE INTEGRITY OF A COMPUTER PROGRAM

(75) Inventor: Frank Zisowski, Muehlheim (DE)

(73) Assignee: Soteres GmbH (DE)

( * ) Notice: Subject to any disclaimer, the term of this patent is extended or adjusted under 35 U.S.C. 154(b) by 620 days.

(21) Appl. No.: 10/175,343

(22) Filed: Jun. 19, 2002

(65) Prior Publication Data
US 2003/0188174 A1    Oct. 2, 2003

(30) Foreign Application Priority Data
Mar. 26, 2002    (EP) .................................. 02006935

(51) Int. Cl.
*G06R 1/24*    (2006.01)
(52) U.S. Cl. ..................... 713/187; 713/189; 713/193; 713/194
(58) Field of Classification Search ........ 713/187–189, 713/193, 194, 200, 201
See application file for complete search history.

(56) References Cited

U.S. PATENT DOCUMENTS

| | | | | |
|---|---|---|---|---|
| 4,104,721 A | * | 8/1978 | Markstein et al. .......... 711/164 |
| 4,310,720 A | * | 1/1982 | Check, Jr. .................. 713/155 |
| 4,328,542 A | * | 5/1982 | Anastas et al. ............. 711/163 |
| 4,494,114 A | * | 1/1985 | Kaish ........................ 340/5.31 |
| 4,609,777 A | * | 9/1986 | Cargile ...................... 713/184 |
| 5,343,527 A | | 8/1994 | Moore .......................... 380/4 |
| 5,673,315 A | | 9/1997 | Wolf ............................. 380/4 |
| 6,149,522 A | | 11/2000 | Alcorn et al. ................. 463/29 |

OTHER PUBLICATIONS

European Search Report from EU 02006935.7 dated Nov. 14, 2002.

* cited by examiner

*Primary Examiner*—Thomas Peeso
(74) *Attorney, Agent, or Firm*—DLA Piper US LLP

(57) ABSTRACT

A method of protecting the integrity of a computer program running on a computer device includes a procedure of detecting whether or not an unauthorized modification of the address space of the program has occurred and terminating program execution if an authorized modification is detected and continuing program execution if no such modification has been detected. A communication method between at least two communication parties of a computing device includes the step of generating at each of the communication parties for every communication sequence at runtime a private key and a public key for a digital signature, making available the public key to the other communication parties and performing the communication between the communication parties using a digital signature based on the private and public keys. Both methods provide improved protection against possible violations of integrity and authenticity by malicious programs on a local computer system.

29 Claims, 11 Drawing Sheets

METHOD OF PROTECTING THE INTEGRITY OF A COMPUTER PROGRAM

FIELD OF THE INVENTION

The present invention relates to a the security of computer systems and in particular to the protection of integrity and authenticity of a computer program running on a computing device and a communication method between at least two modules of a computer system.

DESCRIPTION OF THE RELATED ART

The security of computer systems depends on three factors: availability, confidentiality and integrity. Moreover, due to its importance in a growing number of applications, authenticity is added as a fourth factor.

Availability is defined as the requirement that a computer offers its services to authorized users within a time specified by the security policy. A confidentiality demand specifies in accordance with the security policy that some piece of data must be kept secret from unauthorized users. Integrity is the requirement that data and programs are modified, i.e. created, changed and deleted only by authorized users according to the security policy. And, lastly, authenticity requires that the receiver of data or a program is able to verify the claim about the identity of its sender.

The present invention addresses problems posed by malicious programs, e.g. Trojan horse programs, viruses and worms, which run on a user's computer or in his account without his consent and, most often, also without his knowledge. There are many ways in which a malicious program can exploit to enter a computer system of a user. Popular operating systems like e.g. Windows 2000 or Linux have an access control system which grants rights to a program based on the identity of the user who started it. These operating systems do not support program-based control of access rights. Thus, once in place, a malicious program is endowed during its execution with the users rights and privileges and can perform a whole range of malicious operations unintended by the user, e.g. delete files, modify programs or interfere in the communication of programs.

The threats of malicious programs are serious. On the one hand, there is a growing number of applications which perform security-relevant tasks in the users account, e.g. encryption, digital signatures, home banking, e-commerce, financial or other confidential transactions. The security of these applications most often depends on their proper execution in the user's account or on his/her personal computer. On the other hand, current protection mechanisms such as firewalls, virus scanners and e-mail filters aim only at preventing a malicious program from entering the computer. The practice demonstrates, however, that this protection is often insufficient.

The majority of computer-based workflows, processes and operations require a connection to a local area network (LAN) or the Internet. In view of the commercial development of stationary and mobile e-services—and their promotion by many governments—the number of network-dependent applications will undoubtedly grow further. The Internet which plays the central role in remote communication, is an open worldwide network. A consequence of its structure and design is that communication over the Internet is subject to a variety of threats. Data travelling on it can be intercepted and read by persons other than just its receiver, which violates the data confidentiality and the communicating parties' privacy. Data can also be modified by an unauthorized party in the Internet to violate its integrity or wrong data can be inserted to violate its authenticity, the consequences of which can be unpredictable. Lastly, an attacker in the Internet can affect availability.

Cryptographic techniques are regarded as a strong protection of confidentiality, integrity and authenticity.

To enforce confidentiality the sender encrypts the data on his computer and sends it in encrypted form to the receiver. Encryption camouflages the semantics of the data and the employed algorithms ensure that an unauthorized user who is able to read this data is still unable to reconstruct and recognize its intended meaning. Only the authorized receiver is able to decrypt the encrypted data with his secret key. Therefore, cryptographic techniques prevent a violation of confidentiality.

To enforce integrity and authenticity the sender attaches to the data a digital signature which identifies both the data and the sender. The use of a digital signature is schematically illustrated in FIG. 2. In step S1 the sender generates the secret private key and a public key which can be accessed by the receiver (step S2). The digital signature is then attached to a message using the private key. The message with attached digital signature is sent to the receiver who is able to verify integrity and authenticity of the message using the public key of the sender. An unauthorized user who is able to modify the data or its signature is still unable to modify them in such a way that the signature matches the data and the original identity of the sender. The receiver of the data with the attached digital signature as any other user who possesses some public information on the sender can check if the data of the signature has been modified during the transmission and so verify the claim about the identity of its sender.

Therefore, cryptographic techniques like the digital signature cannot prevent, but at least allow a detection of a violation of integrity and authenticity of a message sent over a communication network. The strength of cryptographic techniques relies on two assumptions.

1. The potential attacker has access only to the encrypted or signed data and otherwise publicly available information.
2. Given this data, it is computationally infeasible to decrypt the data or to forge a digital signature.

The second assumption is justified on the grounds of formal mathematical arguments and on the present computing power; it can be verified with rigor close to a proof.

Contrary to this, the conditions of the first assumption are simply taken as granted. This, however, is the point where malicious programs need a detailed consideration.

The stronger the mathematical properties of cryptographic techniques, the less likely it is that an attacker attacks them. Hence, other less secure parts of the system become the preferred target of an attack.

To compromise confidentiality a potential attacker can attempt to gain access to the user data directly and steal it. Access control, however, is a reliable technique and actions of outsiders on a computer system are often carefully monitored. A more convenient way for the attacker is to trick the user into running a malicious program and let this program send secret data of the user's secret key to him as if on behalf of the user himself.

An even closer focus is to be placed on malicious programs if the attacker intends to compromise integrity and authenticity, e.g. to force a digital signature. This secret signing-key needed to generate such signatures is often stored in an irretrievable manner on a smartcard which, in turn, is protected by a secret number, the PIN, known only to the user. Thus, to generate digital signatures on his own, the attacker must steal the smartcard of the user and compel him to disclose the PIN. As a result, of this action the user is likely to invalidate the smartcard and, consequently, any forged signatures. On the other hand, a malicious program running in the user's account or on his computer can innocuously generate digital signatures for any data and distribute this signed data as if on behalf of the user.

In the Internet age malicious programs are popular and convenient means of attack. They can be easily distributed and sometimes they do not even need any explicit action of the attacked user to start execution, the execution can be camouflaged and they can perform every operation the user can once they are in place.

SUMMARY OF THE INVENTION

The present invention therefore addresses the following two problems:
1. the enforcement of the integrity of program code during its execution,
2. the enforcement of integrity and authenticity of local communication in a computer system.

The first problem is solved by a method of protecting the integrity of a computer program running on a computer device, comprising the steps of starting execution of the program, detecting whether or not an unauthorized modification of the address space of the program has occurred, terminating program execution if an unauthorized modification is detected and continuing program execution if no such modification is detected.

The method guarantees that the code located in the address space of the program during its execution, i.e. the program's own code as well as the code of dependent libraries and modules linked to it is that intended by the author of the program.

An error message may be issued if an unauthorized modification of the address space of the program is detected.

For detecting an unauthorized modification of the address space of the program a cryptographically strong hash-function may be employed. This secures that the modification of only one bit in the address space results in a significant difference in the hash-function which can easily be detected.

The method may comprise a program installation procedure including the steps of computing a hash-function h (M) of the program modules and computing a hash-function h (L) of run-time libraries and linked modules.

Preferably, the hash-functions are stored in a modification-protected storage area. The modification protection may be realized by the operating environment via access controls and/or user accounts. An unauthorized modification of the hash-functions can therefore be prevented. Due to the small size of the hash-functions a storage area which has to be protected from modification can be very small, e.g. some kilobytes.

The program itself is only granted temporary access to the modification-protected storage area during the installation process.

The detection step may allow the identification of missing, added or modified program modules. This facilitates the detection of a possible malicious program responsible for the unauthorized modification.

The method according to the invention may be applied to any kind of computer program running on a computer device ranging from mainframe computers, desktop computers, mobile devices like laptops, personal digital assistants or mobile phones to embedded computers or microcontrollers.

The invention is particularly useful for security sensitive programs like digital signature programs, financial transaction programs or the like.

The present invention also provides a computer device being programmed to perform the method as defined in claim 1, a computer program comprising program code for performing the method as defined in claim 1 as well as a storage medium having stored thereon a computer program having program code for performing the method according to claim 1.

According to a second aspect of the present invention a communication method between at least two modules of a computing device is provided, comprising the steps of starting a communication sequence between the at least two modules, generating at each of the modules for every communication sequence a private key and a public key for a digital signature, making the public key of one module available to the respective other modules, and exchanging messages between the modules with attached digital signatures using the respective private and public keys.

With the second aspect of the present invention it can be guaranteed that two or more programs, drivers or other modules, which communicate with each other on a single device can check upon receipt of data if the data has been modified during the transmission and if the data originates from the expected sender. The second aspect of the invention therefore solves the second of the two problems mentioned above.

Since the communication sequences between different modules of a computer system are in most cases rather short it is difficult for any attacker to forge even a less strong digital signature. Preferably, the keys of the digital signature are invalidated upon termination of every communication sequence.

The public key of each of the modules for which secure communication should be enabled may be stored at predefined fixed address in a modification-protected storage area. In the modification-protected storage area of a module there are also stored the fixed addresses of the public keys of the other communicating partners of the secure communication. Every module therefore has access to the respective private keys of the other modules. The fixed addresses may be hard-coded into the storage area and are not known to third parties outside the system.

Each module may be subjected to an integrity-protection procedure according to the first aspect of the present invention.

According to the second aspect of the invention there is also provided a computing device comprising a plurality of functional modules which communicate with each other, comprising a key generating unit for generating a private key and a corresponding public key, a digital signature attaching unit for providing a message matched with a digital signature using the private keys a modification-protected memory area having a fixed address for storing the public key, a modification-protected memory area having stored thereon the fixed address of the public keys of other modules to which secure communication should be enabled, and a digital signature verifying unit for verifying integrity and authenticity of the received messages from the other modules using the respective public key of the other modules.

According to the second aspect of the invention there is also provided a computer program comprising program code for performing the method of claim 20 as well as storage medium having stored thereon a computer program for performing the method as defined in claim 20.

BRIEF DESCRIPTION OF THE DRAWINGS

The present invention and further features and advantages thereof will more readily become apparent from the following description of specific embodiments of the present invention with reference to the accompanying drawings, in which.

A) EXPLANATION OF SOME EXPRESSIONS

Figure 1:
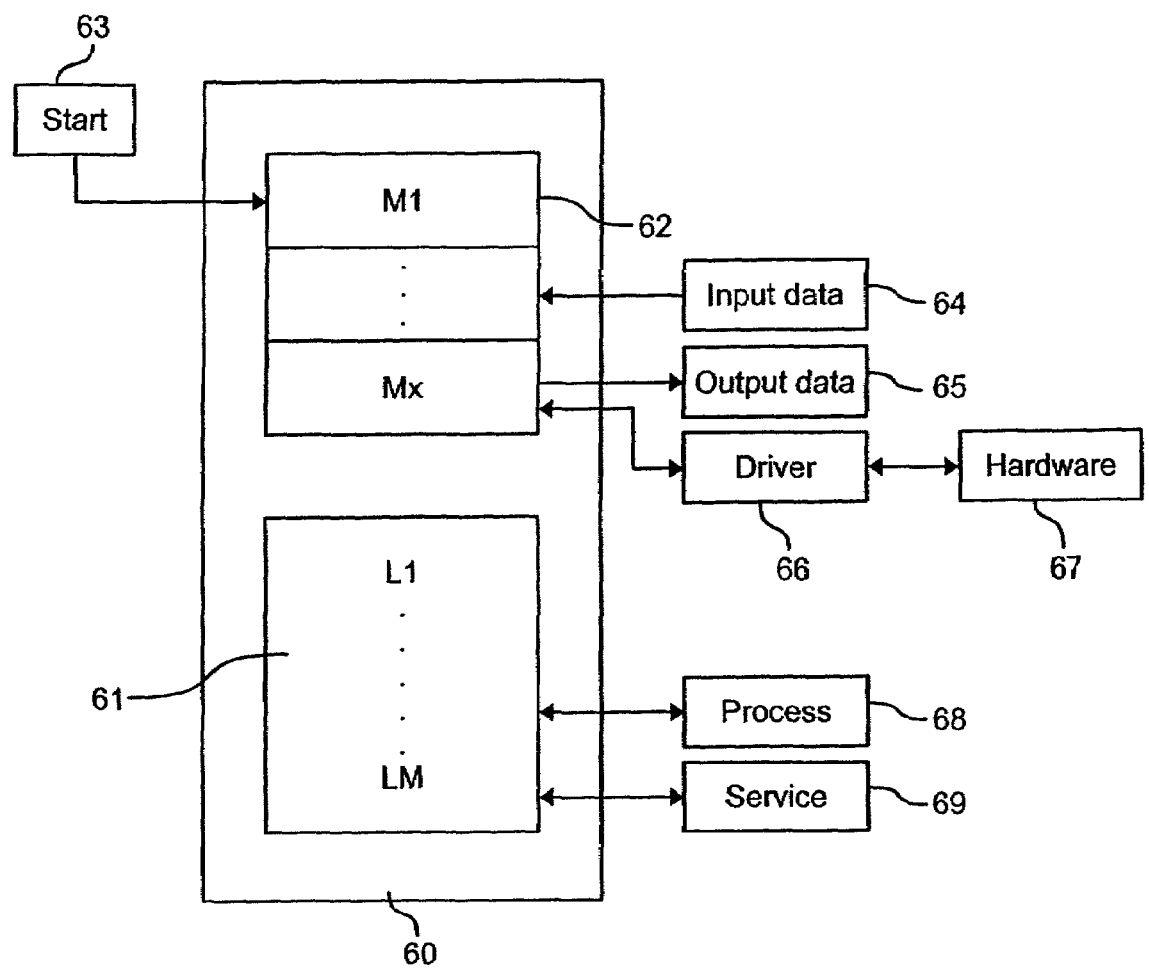
FIG. 1 is a schematic diagram of the execution of a computer program depicting the address space of the same.
Figure 2:
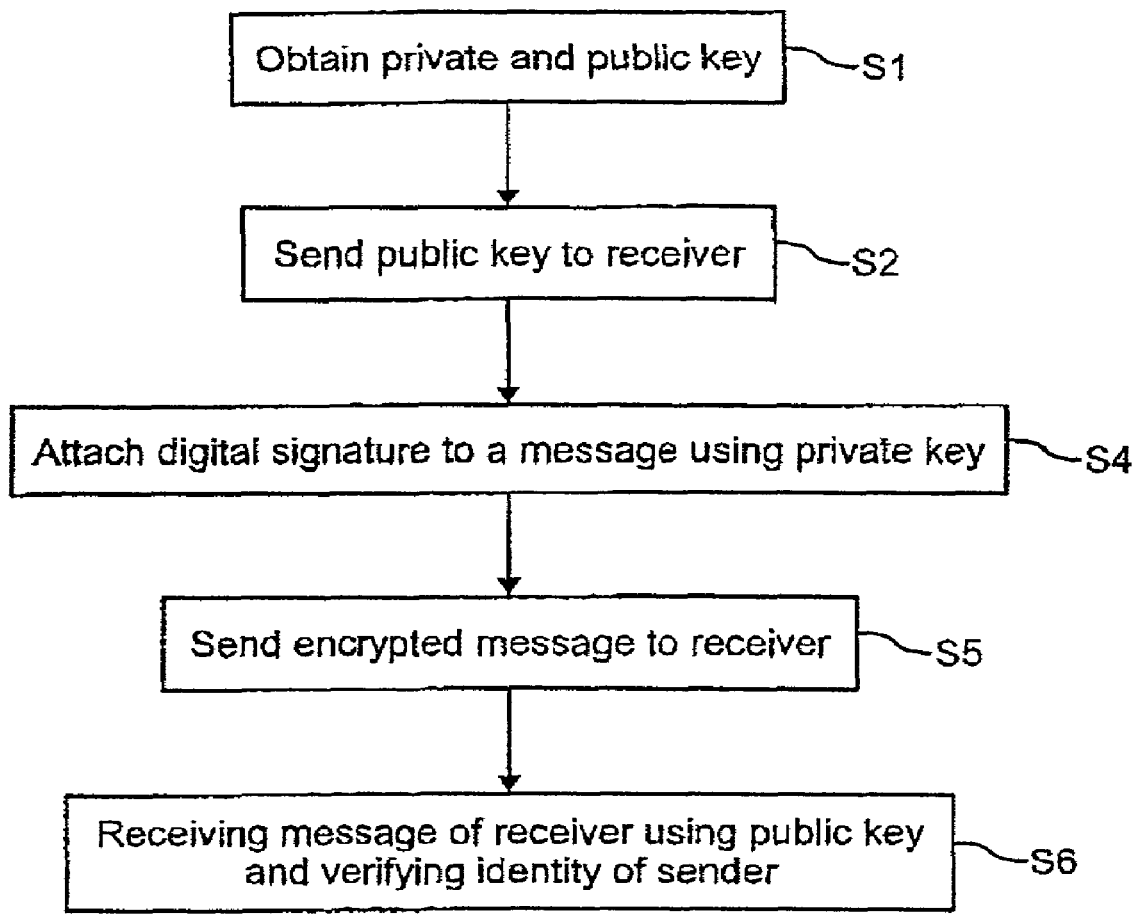
FIG. 2 is a schematic flow chart of the procedure of sending a message using a digital signature.

Computer device/computing device: any device of any size or performance-level carrying out predefined instructions according to a program code including mainframe computers, desktop computers, laptop computers, personal digital assistants, mobile phones, embedded computers and microcontrollers.

Program module: part of a computer program which communicates with other modules, including subprograms or -routines, drivers interfaces.

Address space: the code of a program plus the code of all libraries or modules linked to it or used by it during program execution.

asm-function: function that returns the names of all modules in an address space of a program, i.e. those supplied by the program itself and those supplied by the operating environment in run-time.

Operating environment: program or network functions which provide basic administration functions for a program; examples are a PC operating systems like Windows XP or Linux or PDA operating system like Palm-OS.

Hash-function: mathematical function that maps a predetermined data set to a mathematical value, so that a unique identification of the data set is possible through the hash-function.

Digital signature: method of using cryptographic techniques to certify the source and integrity of a particular electronic document.

Crypotgraphic keys: A mathematical value that is used in an algorithm to encrypt an electronic document.

B) ANALYSIS OF POSSIBLE THREAT SCENARIOS

Whenever malicious programs are regarded as a threat firewalls, virus scanners and access controls are suggested as protection means. However, the actual protection offered by them is most often inadequate.

A firewall controls the ports of a computer, i.e. the slots it uses to send and receive data from the network t which it is connected. Data travelling on a network is grouped into packets. A firewall can decide:

if a port is open for communication
if an application is allowed to use a port
if an inbound data packet is allowed to enter the computer
if an outbound data packet is allowed to leave the computer.

Malicious programs enter a computer from a network in data packets, the same way as any data does. The ability of a firewall to prevent this entrance is very limited. A closed port cannot be used for the reception or sending of any data, which trivially implies that it also cannot be used for the transmission of a malicious program. But let us suppose that a port is open and an application, e.g. an e-mail program is allowed to listen on it for inbound data packets. From the perspective of a firewall a data packet comprises the network address of the sender, the network address of the receiver and a payload. The firewall has no notion of the semantics of the payload and, consequently, cannot recognize if it is a part of a malicious program. The decision to reject or to let an inbound data packet addressed to an open port pass must therefore be made on the grounds of the network address of the sender. Some applications, e.g. database systems, often expect data only from a small set of sources, the addresses of which can be specified in and examined by a firewall. However, many applications—some of which are indispensable, e.g. e-mail clients and web browsers—accept data from all but possibly a few excluded sources. Here, since the firewall will pass almost every data packet, it is apparently of no avail. This fact is one of the main reasons for the popularity of embedding malicious programs in e-mail messages and HTML-pages. Moreover, the network address of the sender in a data packet is unreliable. It can be easily forged and provides no proof of origin. Lastly, the distribution of malicious programs employs more and more frequently a technical variant of social engineering. As soon as a malicious program enters a computer, it looks for addresses of other presumably friendly computers, e.g. in the address of the user, and sends itself or other malicious programs to them. The firewall of the recipient cannot recognize that the computer of the sender is sabotaged and, possibly embedded in a friendly message, the recipient himself has little chance of spotting the malicious content, too.

A virus scanner is a program that attempts to detect malicious programs by comparing the computer storage, e.g. files or main memory, with its own list of patterns of such programs. This approach to detection already points to its drawbacks. Firstly, to be part of a virus scanner's list of patterns the malicious program must already be known and analyzed, i.e. somebody must first suffer from the damage of a new malicious program—on which the scanner failed—and then report it to the manufacturer of the scanner in the hope that it will be detected in future. In view of this fact, secondly, a virus scanner is unlikely to detect a custom targeted malicious program or a sophisticated variant of a known one. And, lastly, if data arrives in encrypted from possibly from a friendly but sabotaged source, then both the virus scanner and the user are prone to failure in detecting the malicious content comprised in it.

Access control systems—the last alleged defense mechanism against malicious programs—found in today's operating systems implement a user-based protection scheme. They restrict access of programs to the resources of the computer, e.g. data files and programs based on the identity of the user associated with the account in which a program is started. In granting or denying a program's access request these access control systems assess in fact the trustworthiness of the user on whose behalf the program is taken to execute and not that of the program itself. To the access control system an access request by a trustworthy program is indistinguishable from that of a malicious program. Consequently, whenever a malicious program submits an access request the access control system assumes that this request is made on the behalf of and with the consent of the owner of the account. Although there exist approaches to strengthen the protection qualities of access control systems—while maintaining its flexibility—with program-oriented controls which considerably reduce the potential damage inflicted by a malicious program, today's operating systems are far from being ready to implement them. Thus, if present at all, access control systems in their present shape place no real restrictions on the actions of a malicious program.

To conclude the analysis of threat scenarios, malicious programs present a threat to integrity which is only inadequately addressed by present technical protection mechanisms. As a result, administrative rules, i.e. a set of not-to-dos, prohibitions and advice which try to instruct the user on how to avoid letting a malicious program in, are often regarded as the essential key to protection. As a result of this, convenient scapegoats to put the blame on are already at hand in case a malicious program does some damage, for example "the user who is always undeniably the weakest link in a chain of protection did not pay sufficient attention to his action, so it is his own fault . . . ". An honest observer, however, will immediately object that this policy requires the user to make decisions for which he completely lacks grounds.

It is absolutely deceptive to root all security assurances on the assumption that no malicious programs execute in the user's context. One must face the fact that an attacker will most often find a surreptitious way to bring such a program on the attacked computer. Therefore, an effective strategy for the protection of integrity must take into account malicious programs and must rely on technical controls which enforce integrity and authenticity of program execution and communication even in the presence of malicious programs.

C) REQUIREMENTS FOR THE PROTECTION OF INTEGRITY AND AUTHENTICITY

With the programmatic specification of a security policy, the protection of integrity and authenticity requires that programs only perform authorized operations. The strategy to effectively enforce integrity and authenticity comprises the following three steps;
i) Identify the components and factors on which a program execution relies
ii) Analyze the vulnerabilities and ways a malicious program can exploit to violate integrity and authenticity
iii) Devise suitable and robust protection mechanisms.

FIG. 1 schematically depicts the components involved in the execution of a program. The program execution consists of the following actions:

a user or program starts the program with a start command 63
the operating environment collects all object modules 62 and run-time libraries 61 required by the program at run-time and includes them in its address space 60 or virtual memory
the operating system initiates the program execution:
a program collects its input data 64, part of which can be supplied by the user
the program communicates with other processes 68, drivers 66, services 69 and further communicating components
the program produces its output data 65
the program terminates or is terminated.

The actions of program execution can be repeated several times in any order.

In the following each of the actions listed above is closely examined and the necessary requirements for the retention of its intended semantics are determined. Then some possibilities to violate its integrity or authenticity are discussed.

a) Integrity and Authenticity of the Program Start

A program can be started by an interaction of a user or by a command of a running program. To avoid a violation of integrity or authenticity already at this early stage, two requirements must be met:
Req 1: The initiator must ensure that the operating system starts the intended program.
Req 2: The program selected for execution by the operating system must ensure that the order of its execution is authorized by the user.

The unequivocal name of a program local to a computer is defined by a full directory path and by a name local to that directory. Violations of both requirements mentioned above can be observed quite often with malicious programs.

To exploit the search path for files or the relative path addressing of files offered by most operating systems a malicious program is given the local name of the intended, already existing program and stored in a place that is searched for that name prior to the place in which the intended program resides. If a malicious program has modifying access to the intended program it can replace or manipulate its content directly.

Thus, to satisfy Requirement 1 the initiator must ensure that the program selected for execution by the operating system is the program with the intended content.

Requirement 2 is concerned with the problem that a program can be started by a malicious program to perform unauthorized operations. T satisfy this requirement a program itself or the operating system must be aware of authorized conditions for starting this program and it must be possible to verify these conditions. To give an example, if a program is intended to be started only in an interactive fashion by the user, then it must not execute if it is started from within a command file or another (possibly malicious) program.

b) Integrity and Authenticity of the Program Address Space

The address space of a program is populated by the operating system with its static object modules and with dynamic run-time libraries.

The static modules are part of the program file. If Requirement 1 above is enforced it can be taken for granted that the intended object modules are placed in the address space of the program.

Hence, to violate the program's integrity or authenticity at this stage a malicious program has to include an unintended set of run-time libraries into the address space of the attacked program. The determination of run-time libraries for inclusion can be a recursive process. The names of the run-time libraries the program depends on directly are specified in the program file. If a library depends on further libraries, then their names are specified in the library's file. The selection process terminates when all dependencies are satisfied and no further libraries are required, i.e. upon the computation of the libraries' transitive closure Since run-time libraries are stored in the file system like ordinary files, a malicious program can use the attacks described in the preceding section to trick the operating system into selecting an unintended library.

One can now be tempted to restate a requirement for run-time libraries in analogy to Requirement 1 above. Though effective, this feature is likely to be inefficient. The author of a program knows for sure only the names of the directly required run-time libraries. However, their content and possible additional libraries in the resulting transitive closure, which is the smallest set of libraries actually needed for the program execution on a particular computer, can depend on the version of the operating system, its service packs, patches and other properties of the run-time environment.

Thus, the determination of all required run-time libraries on the computer of the developer is likely to limit the ability of the program to execute on a broad range of computers. It is therefore necessary to establish the intended state of a run-time library on the target computer. In view of our aim of guaranteeing the program's address space integrity and authenticity in the first place, one can, however, confine this procedure to the run-time libraries of the transitive closure on the target computer. The examination results in two requirements:

Req. 3: The program must determine the set of intended run-time libraries necessary for its execution.

Req. 4: The program must ensure that the operating system includes only intended run-time libraries in its address space.

c) Integrity and Authenticity of Communication of one Component or Module with Other Components It is now assumed that the proper execution of a program depends also on the communication with independent components or modules outside its own address space, e.g. with other programs, drivers or services. The integrity and authenticity requirements of locally communicating components are exactly the same as those of remotely communicating parties.

Req. 5: Upon the receipt of data the receiver must be able:
i) to establish if the data has been modified during transmission
ii) to verify the claim about the author of the data, and
iii) to verify the claim about the sender of the data.

Communication between local components is usually managed by the operating system of the computer. The sender uses a system call to send data (often denoted as a message) to a receiver, i.e. the sender instructs the operating system to deliver the data to the receiver. The operating system acts like a postal service, i.e. it collects the data at the sender and delivers it to a receiver. Requirement 5 i) is most often satisfied by the operating system. But, though available to them, neither Linux nor Windows provide to the receiver the information about the identity of the sender so that Requirement 5 iii) must be taken care of by the communicating parties. And lastly, the operating systems do not have any provision for the recording of the identity of the author of a piece of data. Consequently, the communicating parties are also responsible for this Requirement (5 ii)).

The difference between the sender and the author of data is important if the malicious program can record the data passed between the authorized parties. Suppose that a component A performs a critical operation, but only upon request by a specific other component B, if a malicious program records the data sent by B to A, it can, at a later time, send them again to A and request the execution of the critical operation. Even if this data carries a proof of A's authorship B may still be unable to discover its malicious sender.

A common suggestion for the enforcement of Requirement 5 is the use of digital signatures. Each communication component is given an individual secret private key and a public key; the sender signs the outbound data with its private key and the receiver of the data can verify the sender's claims with its public key. This naive approach has two problems in practice: the sender's problem of keeping the private key secret and the receiver's problem of obtaining the authentic public key of the claimant sender. The sender must store its private key at some location, e.g. it can be coded in its executable file or it can be placed in some storage external to it, and it must load this key during its execution into its address space. One way or another, if the attacker can obtain a copy of the executable file or a fragment of the address space with the private key for off-line analysis, then there are reliable techniques for spotting a private key in such objects and retrieving it from them. If the public key of the sender is passed to the receiver as any data is, then a malicious program can try to establish a communication with a component by sending to it its own public key. The receiver will then receive signed data from a malicious source.

The further examination distinguishes two classifications of a communication component:
i) its execution content:
  user-mode; execution subject to access controls
  privileged-mode: execution with unrestricted access
ii) Its cooperation mode:
  special purpose: communicates only with specific components
  general: communicates with all components.

The first distinction has a tremendous impact on the consequences of a successful subversion of the component by a malicious program. And the second one decides on the limits of our ability to equip a servicing component with a list of authorized client components A component which executes in user-mode is, on the one hand, subject to access controls of the operating system, but, on the other hand, can be protected by them. Since access control decisions in user-mode are associated with an account, a malicious program can compromise all programs, data and other components being owned by the same account and in other accounts to which it is granted access. The privileged-mode offers a component full protection from user-mode components and, at the same time, unrestricted access to all resources. In the negative, this implies that it is much harder, if not impossible, to constrain or even detect a malicious program executing in privileged-mode. Most protection strategies therefore assume that a privileged-mode account, e.g. the administrator or root, does not contain malicious components. Though there must always be some components that demand a privileged execution context, the decision on the execution context of many components is left to the discretion of the designers of an operating system. To give an example Windows 2000 executes all device drivers and services in a privileged-mode.

Components of the operating system are most often designed with the aim of providing service to any other component upon requests. These general components do not care about the identity of the client and, as of yet, about the integrity of a communication. Clearly, as soon as the operation of a component is critical this behavior poses a security threat, if an application requires the communication of several independent special purpose components, e.g. a program and a driver, then such components can be designed to take care on their own of communicating only to pre-defined components and of ensuring the demands of Requirement 5 above.

d) Integrity and Authenticity of Input and Output Data

This important concern is outside the scope of this invention.

e) Integrity and Authenticity of Program Termination

This important concern is outside the scope of the present invention.

Both aspects of the present invention use techniques and protection measures applied in large networks for the protection of integrity and authenticity of the execution environment of a single computer. These techniques are:
cryptographically strong hash-functions
digital signatures
run-time generation of cryptographic keys
modification-protected storage.

The present invention aims to present solutions to the above-established Requirements 1 to 5.

D) FIRST ASPECT OF THE PRESENT INVENTION: PROTECTING INTEGRITY AND AUTHENTICITY OF THE ADDRESS SPACE OF A COMPUTER PROGRAM

Figure 3:
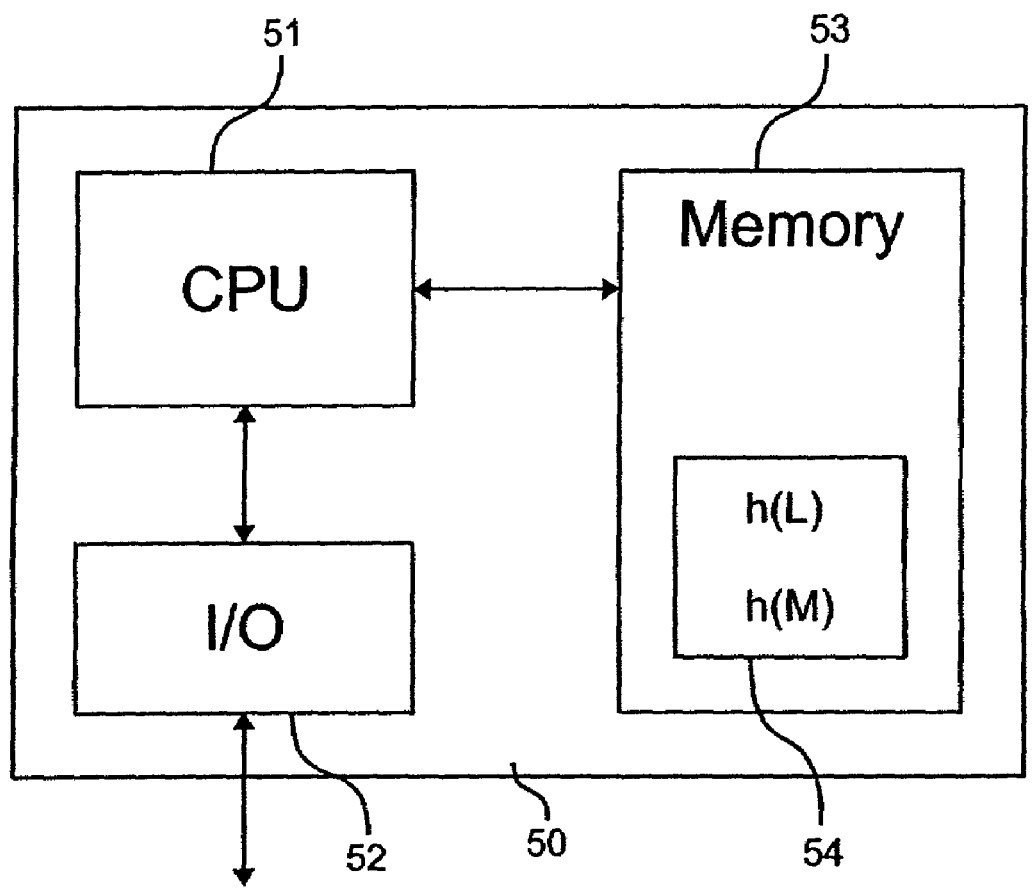
FIG. 3 is a schematic diagram of a computer device on which the present invention may be implemented.
Figure 4:
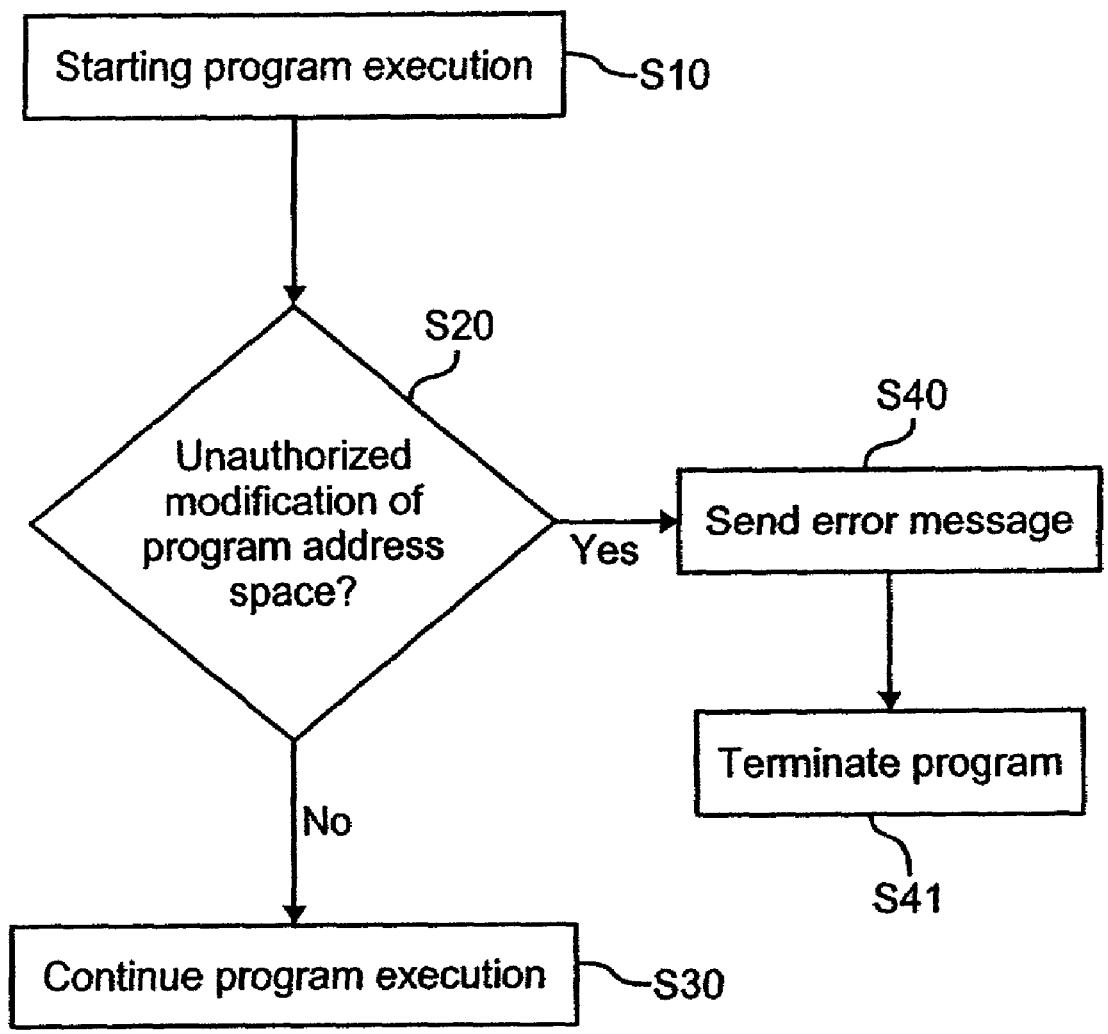
FIG. 4 is a schematic illustration of the method steps of an embodiment of the first aspect of the present invention.

FIG. 4 is a flow chart schematically illustrating the operation steps of a method of protecting the integrity of a computer program running on a computer device according to the first aspect of the present invention. The computer device may, as has been explained earlier, be a computer system of any size or performance level. An example of such a computer device 50 is schematically illustrated in FIG. 3. It comprises a central processing unit 51 which may consist of one or a plurality of microprocessors, an input/output unit 52 serving as an interface to input/output devices like a communication link, a keyboard device, a mouse or a printer as well as a memory device 53. The latter comprises a small area 54 which is protected against modification, for example by the operating system of the computer. The procedure shown in FIG. 4 begins with starting program execution in method step S10. Then, in subsequent method step S20 it is checked at run-time whether or not an unauthorized modification of the address space of the program has occurred. If this is not the case authenticity and integrity of the address space is verified and program execution continues with step S30. If in step S20 an unauthorized modification of the address space is detected, an error message is detected in step S40 and program execution is terminated in subsequent method step S41.

According to a particular embodiment detection step S20 identifies missing, added or modified program modules or run-time libraries in the address space of the program.

Figure 5:
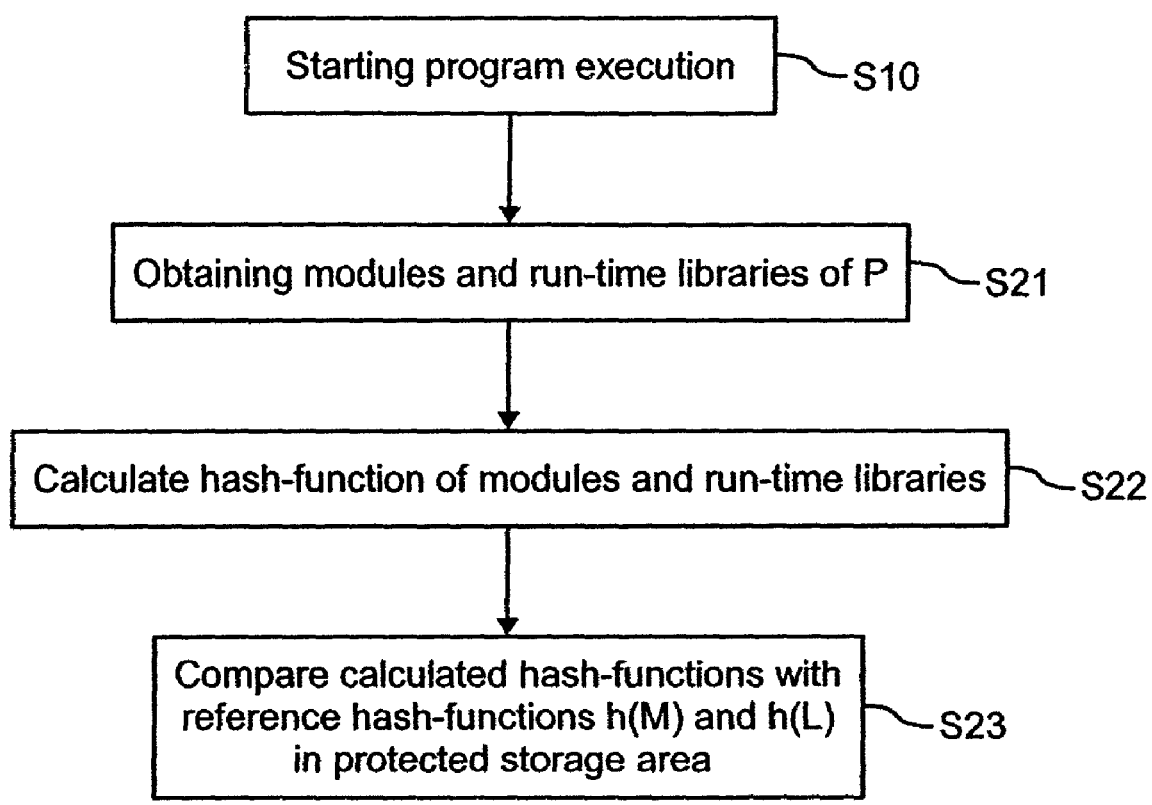
FIG. 5 is a schematic flow chart of the operations of step S20 of FIG. 4.

The detection step S20 is explained in more detail with reference to a flow chart of FIG. 5. After starting a program execution the modules and run-time libraries of program P are obtained in method step S21. To do so an asm-function may be employed as will be explained below in more detail. In subsequent step S22 the hash-function of the modules and run-time libraries are calculated. These hash-functions obtained in step S22 are then compared in step S23 with previously stored reference hash-functions of the module and run-time libraries of the program which have been calculated earlier upon program installation and are stored in a modification-protected storage area (area 54 in FIG. 3 or area 121 in FIG. 7). A hash-function h(D) of a document or data set unambiguously identifies the document or data set D. While it is theoretically possible that two different documents have the same hash-functions, the probability that the hash-function h(D') of a modified document D' is identical to that of the original document D is other hand, the hash-function is a mathematical value having a bit length of about 100 or 160 bits. To protect integrity and authenticity of the program's address space the modification protection of a very small storage area is therefore sufficient.

Figure 6:
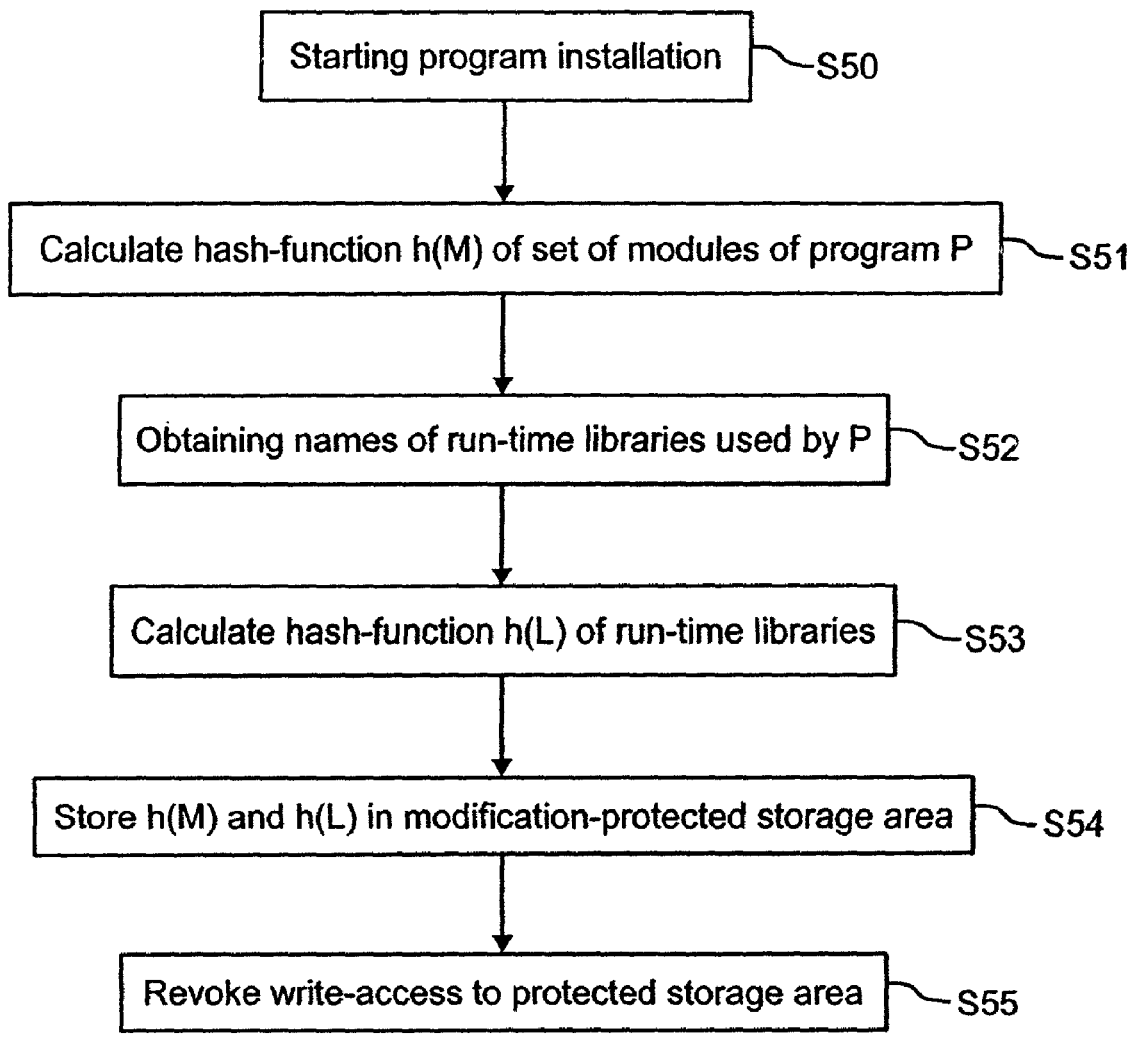
FIG. 6 is a schematic flow chart of a program installation procedure according to a specific embodiment of the first aspect of the present invention.

The program installation process for calculating the hash-function of the address space of the program is schematically shown in the flow chart of FIG. 6.

After starting program installation in method step S50 hash-function h(M) of the set of modules of program P is calculated in subsequent method step S51. Then the names of the run-time libraries used by program P is obtained using a so-called asm-function which is provided by many operating systems. Subsequently, in step S53, the hash-function h(L) of the run-time libraries is calculated and in step S54 the hash-functions h(M) and h(L) or a combined hash-function is stored in the modification-protected storage area of the computer system. Then the write-access to the protected storage area is revoked in step S55 and the installation procedure is terminated.

Figure 7:
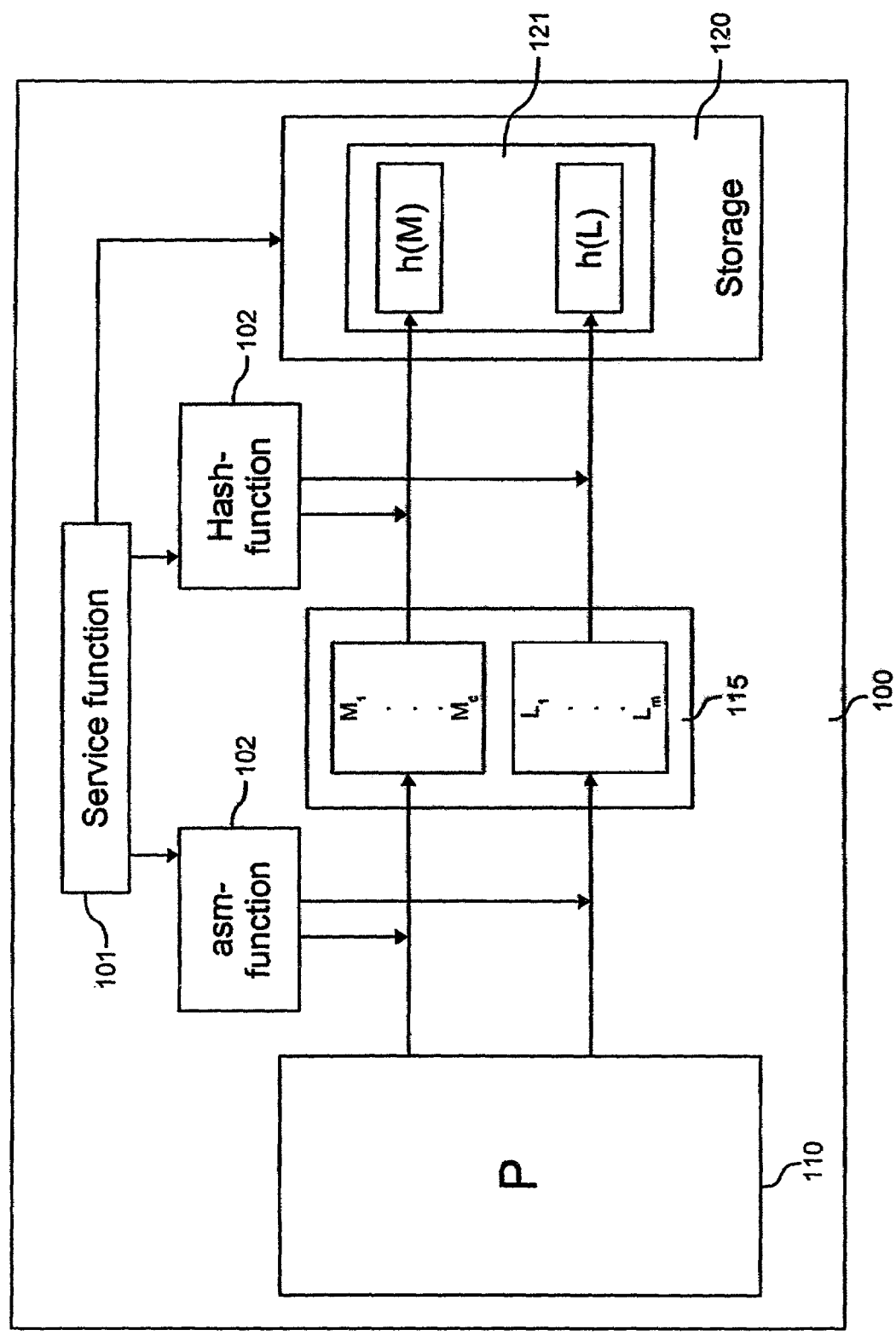
FIG. 7 is a schematic illustration of the operation of generating hash-functions in an embodiment of first aspect of the present invention.

FIG. 7 schematically shows the procedure of calculating the hash-functions of the program address space, either during the installation procedure shown in FIG. 6 or during program execution as shown in FIG. 4. The executing environment 100 comprises a service function 101 which provides an asm-function 102, a hash-function 103 and administrates a storage including a modification-protected storage area 121.

asm-function 102 returns, on the one hand, the names of all modules $M_1, \ldots, M_k$ in the address space 115 of program P as well as the names of all run-time libraries $L_1, \ldots, L_m$. Then a hash-function h(M) of the set of modules and a hash-function h(L) of the run-time libraries is computed using the hash-function functionality 103. Alternatively, a combined hash-function of modules and libraries may be used.

In the following an example of the method of the first aspect of the present invention is explained in detail.

The prerequisites are:
a small amount of storage that can be protected against modification, i.e. set to read-only
a function asm which returns the names of modules placed in the address space at run-time
a cryptographically strong hash-function, e.g. 160 bits
Procedure for a Program P:
Phase 1: Preparation of P
i) Let $M=\{M_1, \ldots, M_k\}$ be the set of modules provided by P
ii) Compute with the hash-function h the set of values $h(M)=\{h(M_1), \ldots, h(M_k)\}$
Phase 2. Installation of P
i) Copy P and h to its destination ii) Grant to P write-access to the modification-protected storage area
iii) Place h(M) in the modification-protected storage area
iv) Start execution of P
v) Use the function asm to obtain L={$L_1, \ldots, L_m$}, the subset of names of run-time libraries placed in P's address space on the target computer
vi) Compute with h the set of values h(L)={h($L_1$), ..., h($L_m$)}
vii) Place h(L) in the modification-protected storage area
viii) Revoke from P write-access to the modification-protected storage area
ix) Terminate execution of P Phase 3: Execution of P
i) Start execution of P
ii) Use function asm to obtain the set of names of all modules M' and all run-time libraries L' in the address space of P
iii) Compute with h the set of values h(L') and h(M')
iv) Read from the modification-protected storage h(M) and h(L)
v) Test if h(L')∪h(M')=h(M)∪h(L)
  a) Terminate program P if the test fails
  b) Continue with normal execution of the program if the test is passed.

As explained before, according to a variation of the procedure, the test performed in phase 3 at step (v) identifies missing modules, added modules and modified modules. If in the modification-protected (read-only) storage area also the name and location of the modules are stored, then the above-mentioned test can be extended to detect manipulation of this data, e.g. if a module is renamed or moved to a different location.

The first aspect of the invention addresses threats posed by malicious programs. These programs execute in the user's account or context and hence they obtain rights and privileges which are granted by the operating environment to all programs executing in this account. However, a malicious program may also perform operations unintended and therefore also unauthorized by the user. Since the operating environment is unable to discern a trustworthy program from a malicious one, programs with according security requirements cannot depend on the operating environment for the protection against malicious programs. Such programs must therefore, though with the support of the operating environment, ensure a protection on their own.

In the following some typical attacks of a malicious program on the program to be protected and protection qualities of the procedure according to the first aspect of the present invention are discussed:

1. Attack: A module required in the program address space was removed from it.
  Protection: The test at phase 3/step (v) detects a missing element in the set of modules computed at run-time.
2. Attack: A module not required in the address space was added to it.
  Protection: The test at phase 3/step (v) detects an extra element in the set of modules computed at run-time.
3. Attack: A module required in the address space was modified.
  Protection: The test at phase 3/ step (v) detects both a missing element and an extra one in the set of modules computed at run-time.

The detection of various attacks depends on the ability to execute the above-defined protection procedure for a program reliably. This has the following implications:

1. The list of modules in the address space of the program is administered by the operating environment. The list must not be manipulated by the attacker.
2. The use of a hash-function reduces the requirement on the size of the modification-protected storage area to a small amount. And the requirement for a cryptographically strong hash-function ensures that a module can be uniquely associated with its hash-value.
3. The installation phase takes both into account the modules provided by the author of the program and the modules provided by the manufacturer of the operating environment of the system to be protected. On the one hand, this gives the program the flexibility to run on every compatible version of the operating environment. On the other hand, an update of any module in the program's address space necessitates a repetition of the preparation phase or the installation phase for the affected module.
4. The modification-protected storage which stores the reference hash-values must have the following properties:
  a) The program itself must have temporary modifying access to the modification-protected storage for the storage of the reference hash-values during the installation phase.
  b) No other program should modify the reference hash-values. Hence, a possibly malicious program must not have any modifying access to the modification-protected storage. Read-only access need not be prohibited for the stored hash-values need not to be kept secret.
  In an operating environment of this type the modification-protected storage can be realized with access-controls and user accounts.
5. No program can check its own integrity by itself. It is easy to spot it, because an attacker can replace the module that performs the decisive test (phase 3/step (v)) with one in which this test is omitted and therefore render the whole protection scheme useless. Therefore this test must be performed by a third party, the integrity of which cannot be compromised by the assumed attacker. In an operating system this can be realized by a protected service of this operating system or operating environment.

The procedure according to the first aspect of the present invention therefore allows the effective detection of manipulations of the address space of a program.

E) SECOND ASPECT OF THE INVENTION

The second aspect of the present invention relates to the communication between two or more modules or communication parties A, B, ... in a computer system. The modules A, B ... are assumed to communicate via a message-passing system which is used by many (possibly malicious) modules.

Figure 8:
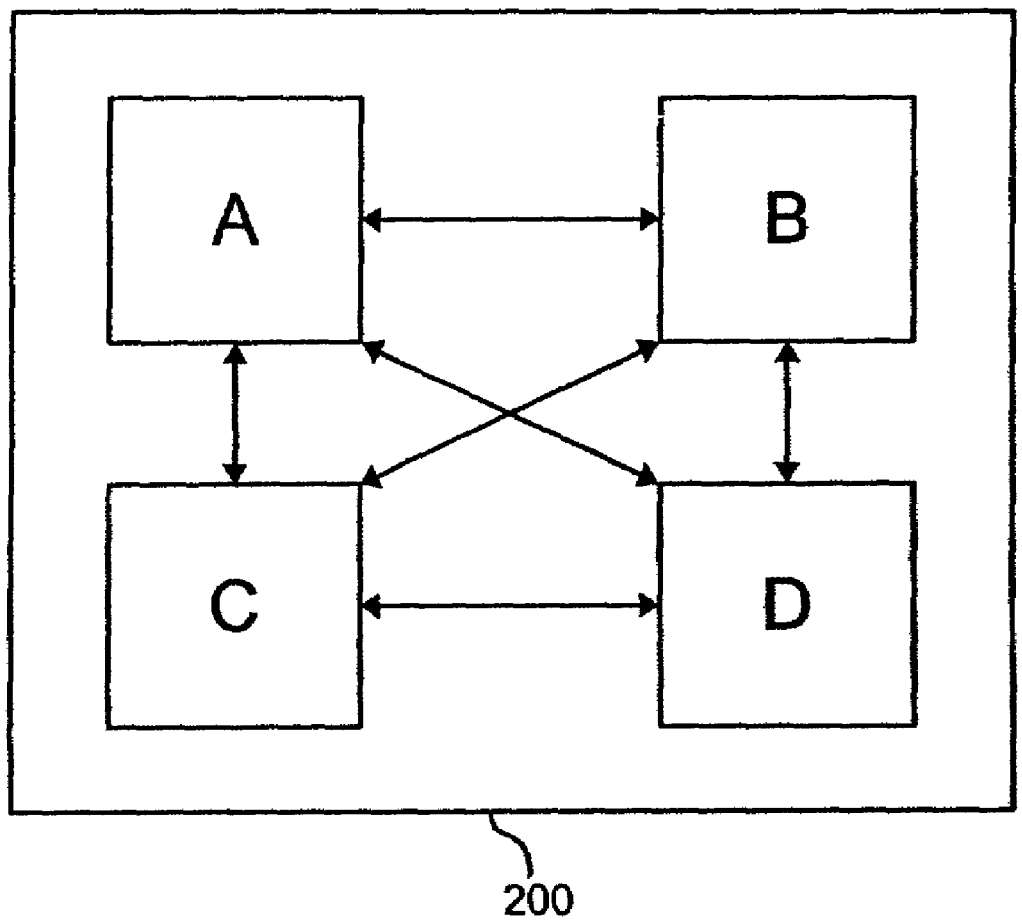
FIG. 8 is a schematic illustration of a computing device having a plurality of modules communicating with each other.

FIG. 8 schematically illustrates a computing device 200 having the modules A, B, C and D. Of course, any other number of modules is possible. The modules communicate with each other via a message-passing system administrated, for example, by the operating environment. If a malicious program has the ability to manipulate data sent between the communicating parties, then, obviously, authenticity and integrity cannot be enforced. However, digital signatures offer the receiver of data the possibility of detecting a violation of these properties. Taken that accredited digital signature schemes with appropriate keys are employed, their reliability at the sender side depends on its ability to prevent any other party from generating digital signatures with the secret private key, and at the receiver side on the possession of the authentic public key of the sender.

Figure 10:
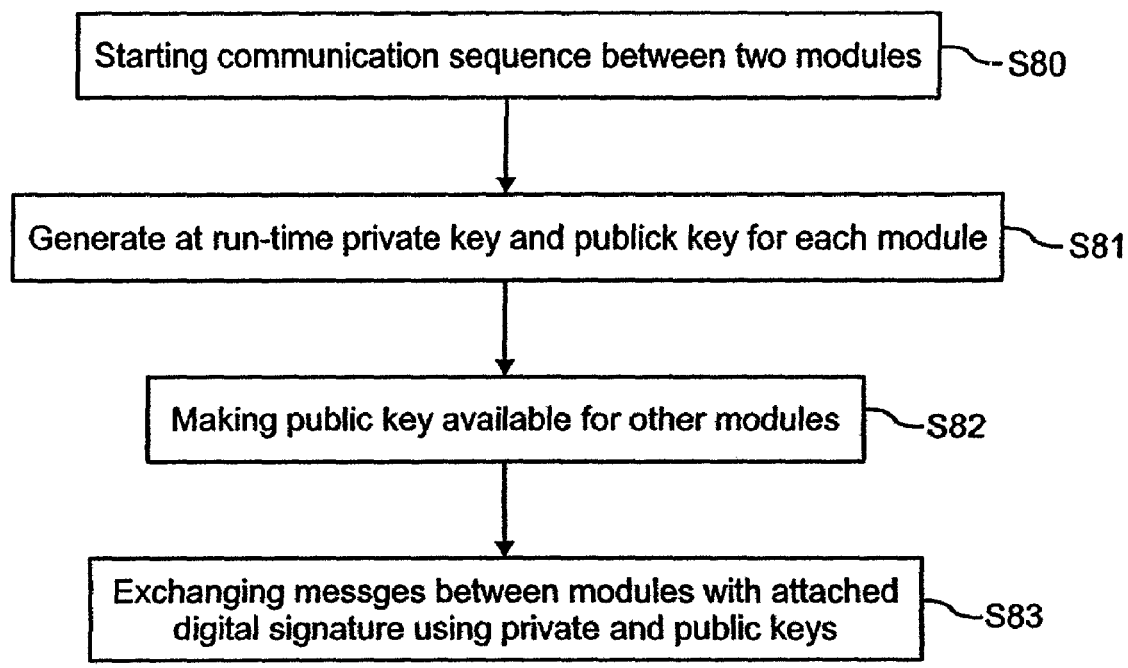
FIG. 10 is a schematic flow chart illustrating the method steps of a specific embodiment of the method according to the second aspect of the present invention.

The communication method according to the second aspect of the present invention is schematically illustrated in the flow chart of FIG. 10. In step S80 a communication sequence between two modules starts. Then, in each of the two modules A, B taking part at this communication sequence a pair of keys (private, secret key and public key) are generated at run-time (step S81). The public key is then made available for the respective other module participating in the communication sequence, i.e. the public key of module A is made available to module B and vice versa. It is then possible to exchange messages between A and B with an attached digital signature in every direction based on the pair of private and public keys (step S83). With this procedure it is not possible to prevent a violation of integrity or authenticity of the message (i.e. changing content or presumed author or sender of the message), but it is possible to detect any such violation as in the case of using digital signatures over large networks. Since the time duration of a communication sequence between two modules of a computer system is rather short and a new set of cryptographic keys is used for every new communication sequence, it is not possible to perform an off-line analysis in order to find out the private key.

Figure 11:
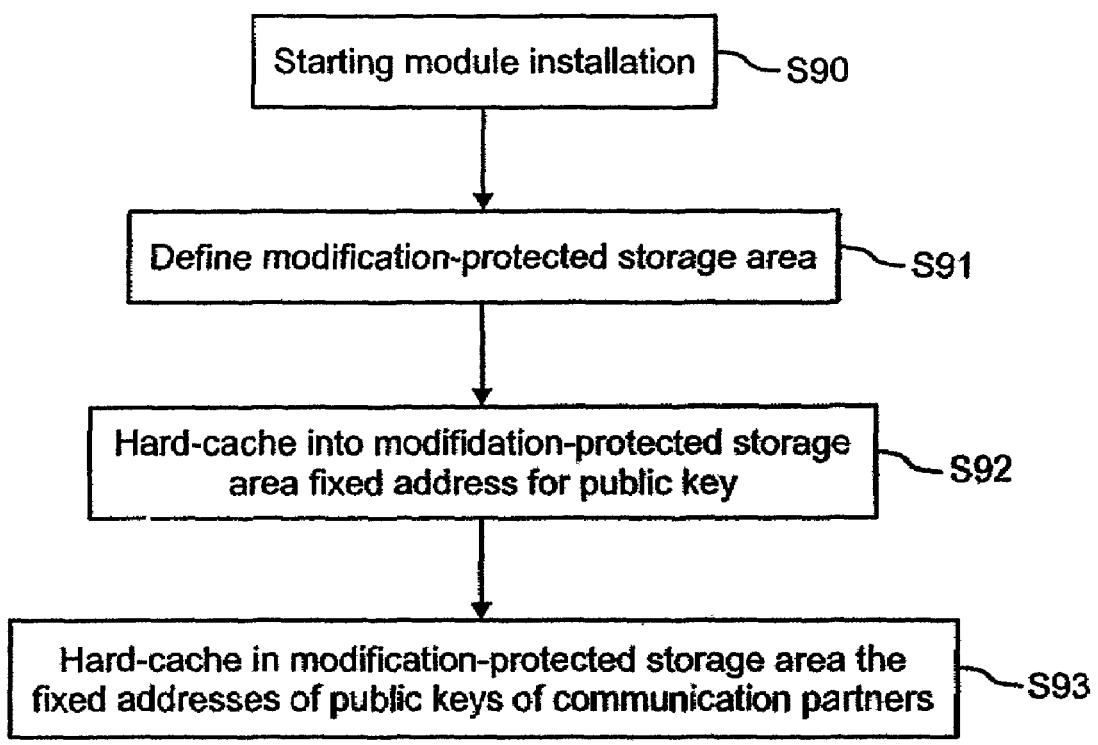
FIG. 11 is a schematic flow chart illustrating method steps of an installation procedure of a specific embodiment according to the second aspect of the present invention.

An installation procedure for a module according to a particular embodiment of the second aspect of the present invention is schematically illustrated in the flow chart of FIG. 11. After starting module installation in step S90 a modification-protected storage area of the module is defined in step S91. Then a fixed address for the public key of this module is hard-coded into the modification-protected storage area (step S92) and, subsequently, in step 93, the fixed addresses of the public keys in the respective modification-protected storage area of the communication partners (modules to and from which secure communication should be enabled) are also stored in the modification-protected storage area. Each module can therefore easily access, on the basis of the hard-coded address information, the public keys of the communication partners. Due to the modification protection this address information cannot be modified by a malicious program.

Figure 9:
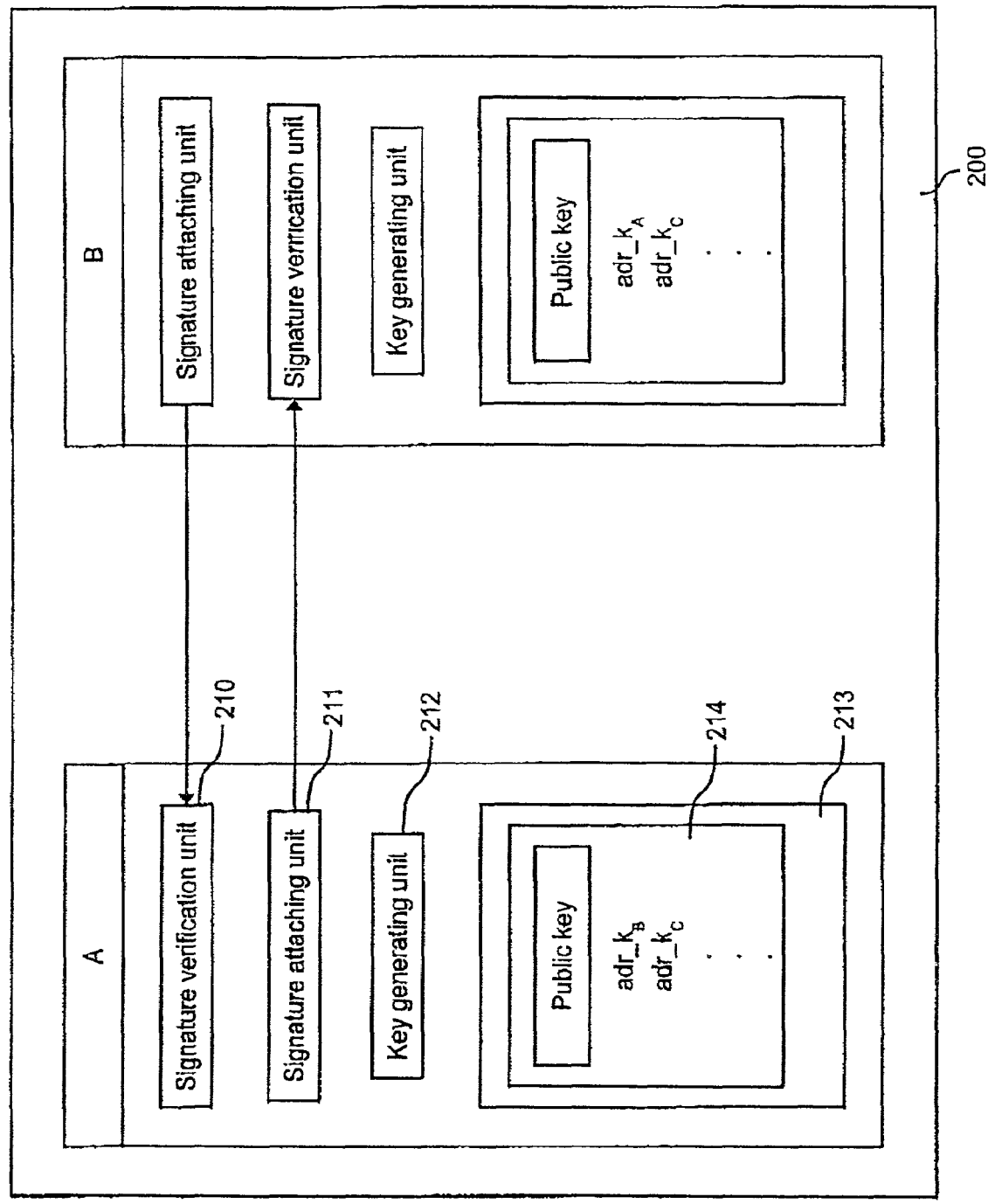
FIG. 9 is a schematic illustration of a computing device according to a specific embodiment of the second aspect of the present invention.

An example of a computing device according to the second aspect of the invention is schematically shown in FIG. 9. For simplicity sake, only two modules A, B are shown. Each of these modules includes a key generating unit 212 for generating during run-time a corresponding pair of private and public keys for use with the digital signature. Each of the modules A, B also comprises a signature attaching unit 211 for attaching to a message a digital signature using the private key as well as a signature verification unit 210 for verifying the digital signature using the public key. An address area 213 of each of the modules comprises a modification-protected area 214, in which the public key of the respective module and the fixed addresses in the modification-protected storage areas of the other modules are hard-coded.

To render an off-line analysis by an attacker useless and to prevent the man-in-the-middle attack and a variety of other attacks, a particular embodiment of the second aspect of the invention employs the following features:
1. The private key and the public key used for the generation and verification of digital signatures are repeatedly generated at run-time for each communication sequence by the sender.
2. A fixed address in the modification-protected storage area for the deposit of its current public key is assigned to each communication party.
3. The name and address specified at 2, of each party with which a module is going to communicate is hard-coded in the module. For these features the following prerequisites are necessary:
   A small amount of storage that can be protected against modification, i.e. can be set to read-only
   A function asm, which returns the names of modules placed in the address space at run-time
   A cryptographically strong hash-function h
   The ability to generate and verify digital signatures.

An example of the communication method according to the second aspect of the present invention is now explained in more detail:

Preparation of module A:
i) Assign to A and hard-code into A a fixed address in the modification-protected storage area for the deposit of its public key
ii) Hard-code into A the fixed address of the public keys of each module with which A is going to communicate
Communication between two modules A and B (can be extended to n parties).
   Phase 1: General preparation
   i) Each module is installed and starts as has been described above with respect to phases 1 to 3 of the example of the first aspect of the present invention
   Phase 2: Preparation of the communication
   i) A and B signal each other the willingness to establish a protected communication
   ii) A generates a pair of keys and writes the public key to its address in the modification-protected storage area (each communication module performs this step)
   iii) A picks up B's public key from the modification-protected storage (each communication module performs this step)
   iv) Protected communication: A and B exchange messages with digital signatures attached to them
   v) Optional: A as well the other modules invalidates its public key in the modification-protected storage area, e.g. with an agreed-upon nonsensical value such as zero.

The ability of a malicious program of interfering in a communication is dictated by the communication model of an operation environment. An essential key to the protection strength of the method according to the invention is the provision of a small modification-protected storage area which stores the current public keys of the communication parties. It must exhibit the following properties:
a) The communication party itself must have temporary modifying access to the modification-protected storage area for the storage of its run-time generated current public key after the commitment to perform protected communication.
b) No other program should be able to modify a public key. Hence, a possible malicious program must not have any modifying access to the modification-protected storage (read-only access need not to be prohibited for the stored public key (need not to be kept secret).

As in the case of the first aspect of the invention in an operating environment this type of storage can be realized with access controls and/or user accounts.

In the following some possible attacks and their consequences to the described system are discussed:
1. Man-in-the-middle attack. This attack assumes that the attacker is able to replace the public keys of one or more parties with his own public keys to which he also possesses the matching private keys.

Protection: No possibly malicious program has modifying access to the storage area for the public keys.

2. Attack: The authenticity of a public key now depends on the fact that a program possesses the correct address of the public key of its communication partner. The address is hard-coded into the program. A malicious program can therefore modify the program code and replace the original address with a forged one.
Protection: Such a modification will result in a failure of the integrity test of the address space of the program as defined in the first aspect of the present invention.

3. Attack: A message is inserted into the communication sequence.
Protection: The digital signature reveals the failure of the authenticity of the message.

4. Attack: A copy of the program code of the communicating parties is sent via the network for offline analysis.
Protection: The code comprises no secret data.

5. Attack: The private key generated at run-time is stored only in the party's virtual memory. The attacker scans the virtual memory in search of the private key of a communicating party.
Protection: For each communication sequence new keys are generated. The length of the keys is chosen so that an on-line analysis is insufficient to compromise the keys. Usually, the virtual memory is inaccessible to other programs and a scan is impossible. On the other hand, due to the short life-time of the keys, their length can be chosen very small, which renders the effectiveness of pattern-oriented scans useless A protected communication can be performed even in the presence of malicious programs. Though a malicious program can interfere with a communication as far as the underlying communication models admit this, violations of integrity and authenticity of the communication can be detected with the method of the present invention.

Protected program execution and protected communication according to the present invention can be performed in many operating environments which provide thus basic protection features. The results are applicable to widely available operating systems as well as to proprietary operating environments, e.g. on mobile devices or the like.

LIST OF REFERENCE SIGNS

50 Computer device
51 Processing unit
52 Input/output unit
53 Memory
54 Modification-protected memory area
60 Address space of program
61 Run-time libraries
62 Object modules
63 Start command
64 Input data
65 Output data
66 Driver device
67 Hardware device
68 Software process
69 Service function
100 Operating environment
101 Service function
102 asm-function
103 hash-function
110 Program P
115 Address space of P
120 Storage device
121 Modification-protected storage area
200 Computing device
210 Signature verifying unit
211 Signature attaching unit
212 Key generating unit
213 Storage device
214 Modification-protected storage area

The invention claimed is:

1. A method of protecting the integrity of a computer program running on a computer device, comprising the steps of: starting execution of the program, detecting whether or not an unauthorized modification of the address space of the program has occurred, terminating program execution if an unauthorized modification is detected and continuing program execution if no such modification has been detected; and
wherein the detecting step further comprises detecting unauthorized modification of program modules of the program and run-time libraries used by program.

2. The method of claim 1, wherein an error message is issued if an unauthorized modification of the address space of the program is detected.

3. The method of claim 1, wherein the detection step comprises a comparison between a hash-function of the program address space with a reference hash-value.

4. The method of claim 3, wherein a cryptographically strong hash-function having a length of at least 100 bits, preferably at least 160 bits, is used.

5. The method of claim 3 or 4, comprising a program installation procedure including the steps of, computing a hash-function h (M) of the program modules, and computing a hash-function h (L) of the run-time libraries.

6. The method of claim 5, wherein the installation procedure comprises computing the hash-function h (M) of modules provided by the author of the program and of external modules provided by the operating environment.

7. The method of claim 5 or 6, wherein the installation procedure is repeated if a program update is installed.

8. The method of claim 5, 6 or 7, wherein h (M) and h (L) are stored in a modification-protected storage area (54; 121) of the computing device.

9. The method of claim 8, wherein the detection step comprises computing the hash-function h* (M) of the program modules and h* (L) of the run-time libraries upon starting program execution, and comparing h* (M) and h* (L) with the hash-functions h (M) and h (L) stored in the modification-protected storage area.

10. The method of claim 3 to 9, comprising using an asm-function to obtain the names of the program modules and the names of the run-time libraries of the address space of the program.

11. The method of one of claims 8 to 10, wherein the modification protection of the modification-protected storage area is realized by the operating environment via access controls and/or user accounts.

12. The method of one of claims 8 to 11, wherein the program itself is granted temporary access to the modification-protected storage area during the installation procedure.

13. The method of one of claims 3 to 12, wherein the detection step comprises identifying missing, added or modified program modules.

14. The method of one of claims 1 to 13, wherein the protected program is a security-sensitive program like a digital signature program, financial transaction program or the like.

15. Computing device, comprising a processor unit (51), at least one storage device (53), input/output units (52), being programmed to perform a method of one claims 1 to 14.

16. A computer program comprising program code for performing a method of one of claims 1 to 14.

17. A storage medium having stored thereon a computer program comprising program code for performing a method of one of claims 1 to 15.

18. A communication method between at least two communication parties (A, B) of a computing device, comprising the steps of: starting a communication sequence between the at least two communication parties, generating at each of the communication parties for every communication sequence a private key and a public key for a digital signature, making the public key of one communication party available to the other communication party, and exchanging encrypted messages between the communication parties with attached digital signatures using the respective private and public keys.

19. The method of claim 18, comprising the steps of writing the public key of each communication party in a predefined fixed address in a modification-protected storage area.

20. The meted of claim 18 or 19, comprising the step of invalidating the public key of each communication party upon terminating a communication sequence.

21. The method claim 19 or 20, comprising an installation procedure for each communication party, which comprises the steps of: defining a modification-protected storage area, hard-code into the modification-protected storage area a fixed address for the public key of the communication party, and hardcode into the modification-protected storage area the fixed addresses of the public keys of all other communication parties, to which secure communication should be enabled.

22. The method of one of claims 18 to 21, comprising an integrity-protection procedure according to one of claims 1 to 14 when operation of the communication party starts.

23. The method of one of claims 18 to 22, wherein the communication parties are local modules of a computer system.

24. A computer program comprising program code for performing the method of one of claims 18 to 23 when executed on a computer.

25. A storage medium having stored thereon a computer program of claim 24.

26. A computing device comprising a plurality of functional modules (A, B, C, D), which communicate with each other, comprising: a key generating unit (212) for generating a private key and a corresponding public key, a signature attaching unit (211) for providing a message with attached digital signature using the private key, a modification-protected memory area (214) having a fixed address for storing the public key, and further fixed addresses of the public keys of the other modules to which secure communication should be enabled, and a signature verifying unit (210) for verifying received messages from the other modules using the respective public keys of the sender modules.

27. The computing device of claim 26, wherein the competing device is a personal computer.

28. The computing device of claim 26, wherein the computing device is a mobile device like a laptop, a personal digital assistant or a mobile phone.

29. The method of one of claim 5 or 6, wherein the installation procedure is repeated if a program update is installed.

\* \* \* \* \*